United States Patent
Webb et al.

(10) Patent No.: US 7,161,518 B1
(45) Date of Patent: Jan. 9, 2007

(54) METHOD AND APPARATUS FOR DRIVING TWO-DIMENSIONAL MODULATOR ARRAYS

(75) Inventors: Douglas A. Webb, Los Altos, CA (US); Stephen Gaalema, Colorado Springs, CO (US)

(73) Assignee: Silicon Light Machines Corporation, San Jose, CA (US)

( * ) Notice: Subject to any disclaimer, the term of this patent is extended or adjusted under 35 U.S.C. 154(b) by 304 days.

(21) Appl. No.: 10/809,978

(22) Filed: Mar. 26, 2004

Related U.S. Application Data (60) Provisional application No. 60/458,760, filed on Mar. 28, 2003.

(51) Int. Cl.
*H03M 1/82* (2006.01)
*H02N 1/00* (2006.01)

(52) U.S. Cl. ......................... 341/152; 341/148; 310/309
(58) Field of Classification Search ................ 341/148, 341/152; 310/309
See application file for complete search history.

(56) References Cited

U.S. PATENT DOCUMENTS

| | | | |
|---|---|---|---|
| RE34,295 E * | 6/1993 | Shibuya et al. ............. | 341/133 |
| 6,543,286 B1 | 4/2003 | Garverick et al. | |
| 6,674,383 B1 | 1/2004 | Horsley et al. | |
| 6,705,165 B1 | 3/2004 | Garverick et al. | |
| 6,750,589 B1 * | 6/2004 | Cabuz ......................... | 310/309 |

* cited by examiner

*Primary Examiner*—Howard L. Williams
(74) *Attorney, Agent, or Firm*—Okamoto & Benedicto LLP (57) ABSTRACT

In one embodiment, a micro electromechanical system (MEMS) driver circuit receives a pulse-width modulated (PWM) signal and uses it to control a voltage at a MEMS cell. The driver circuit further includes a current source, a capacitor, and a reset circuit that can discharge the capacitor. The voltage at the MEMS cell can be controlled in proportion to the pulse width of the PWM signal. In another embodiment disclosed, a MEMS driver circuit receives a first PWM signal and a second PWM signal. Each PWM signal is coupled to a current source. One current source can provide a course current control and the other current source can provide fine current control. The driver circuit can further include a capacitor and a reset circuit for discharging the capacitor. The voltage at the MEMS cell can be controlled in proportion to a summation of the first and second current sources. According to another aspect of the embodiments, a method of controlling a voltage at a MEMS cell is disclosed. The method includes the steps of receiving a PWM signal, controlling a current source with the PWM signal, and adjusting the voltage at the MEMS cell in proportion to a pulse width of the PWM signal.

16 Claims, 10 Drawing Sheets

METHOD AND APPARATUS FOR DRIVING TWO-DIMENSIONAL MODULATOR ARRAYS

CROSS-REFERENCE TO RELATED APPLICATIONS

The present application claims the benefit of U.S. Provisional Application No. 60/458,760, entitled "Method and apparatus for driving two-dimensional modulator arrays," filed Mar. 28, 2003 by inventors Douglas A. Webb and Stephen Gaalema. The disclosure of U.S. Provisional Application No. 60/458,760 is hereby incorporated by reference in its entirety.

BACKGROUND OF THE INVENTION

1. Field of the Invention

The present invention relates generally to micro electromechanical systems (MEMS) and, more particularly, to circuits and methods for controlling a voltage in MEMS cells.

2. Description of the Background Art

A MEMS or micro electromechanical (MEM) device typically includes micromechanical structures or light modulating elements that may be actuated using electrical signals. The light-modulating elements may comprise, for example, Grating Light Valve™ (GLV™) light modulating elements available from Silicon Light Machines, Sunnyvale, Calif. (GLV™ and Grating Light Valve™ are trademarks of Silicon Light Machines). A light modulator may include an array of moveable structures referred to as "ribbons." Light modulators may be used in various applications, including video, printing, optical switching, and maskless lithography, as just a few general examples.

Figure 1:
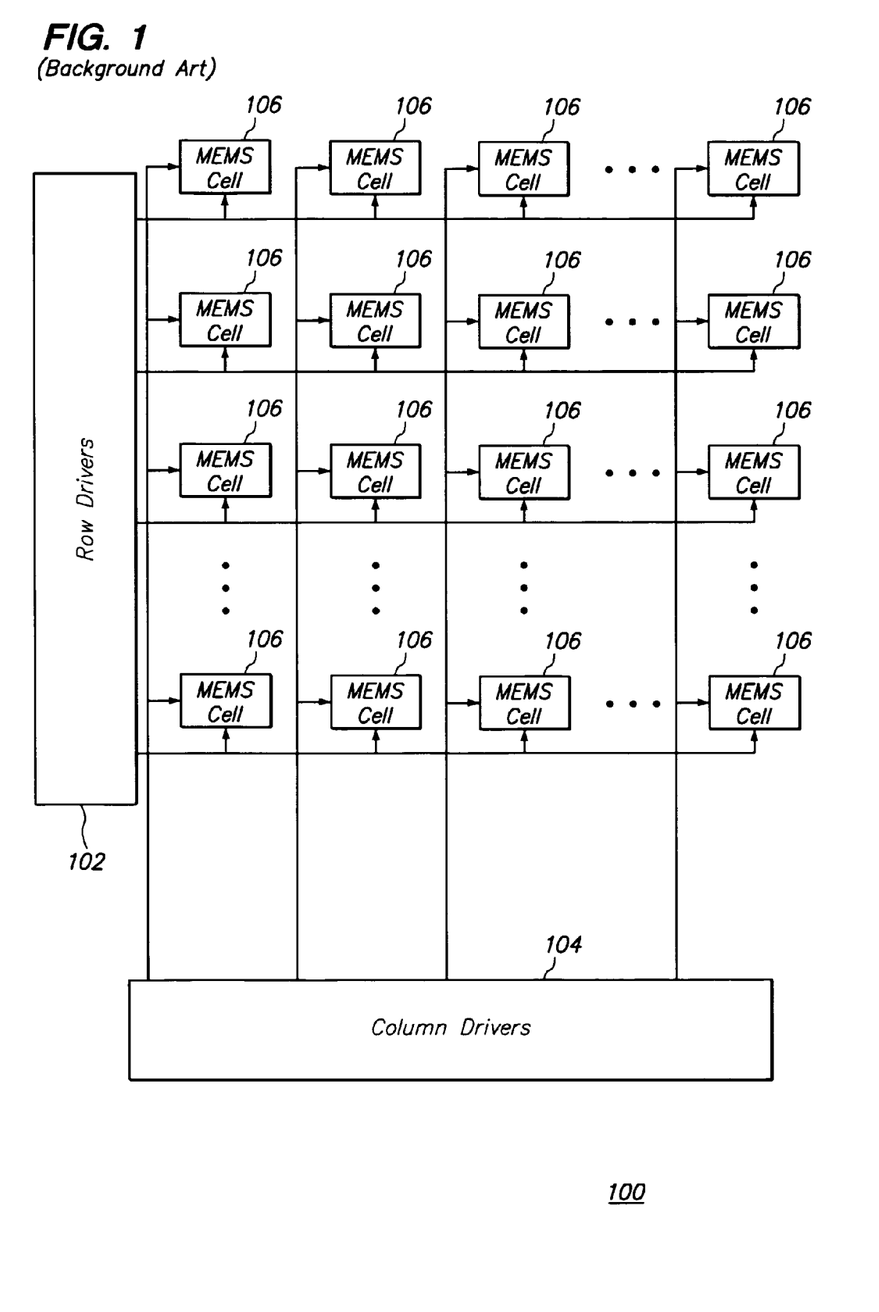
FIG. 1 illustrates a conventional MEMS array including row and column drivers.

Lithography and imaging applications using MEMS devices often require very large numbers of pixels to achieve high data rates. In some applications, a two-dimensional array of pixels may be required and the total number of pixels is typically too high to allow for individual MEMS cell driving control. That is, for a large two-dimensional array, each MEMS cell typically does not have its own dedicated driver circuit. Instead, row drivers, including driver circuits for each row, and column, including access circuits for each column, are used to control the MEMS cells. Such an arrangement 100 is shown in FIG. 1. The row drivers 102 deliver the stimulation signal for a given row of elements and the column drivers 104 are used to select the correct row stimulation for a given column. By using both together, all elements (MEMS cells 106) may be driven with the desired stimulation in turn.

The MEMS cells 106 can include light modulators organized as "pixels." These pixels can require precise analog control for providing gray scale at an image target. In some applications, these MEMS arrays use pulsed laser sources on the surface of the modulator. Accordingly, the MEMS device would only need to be at an intended voltage state for a relatively short period of time.

Figure 2:
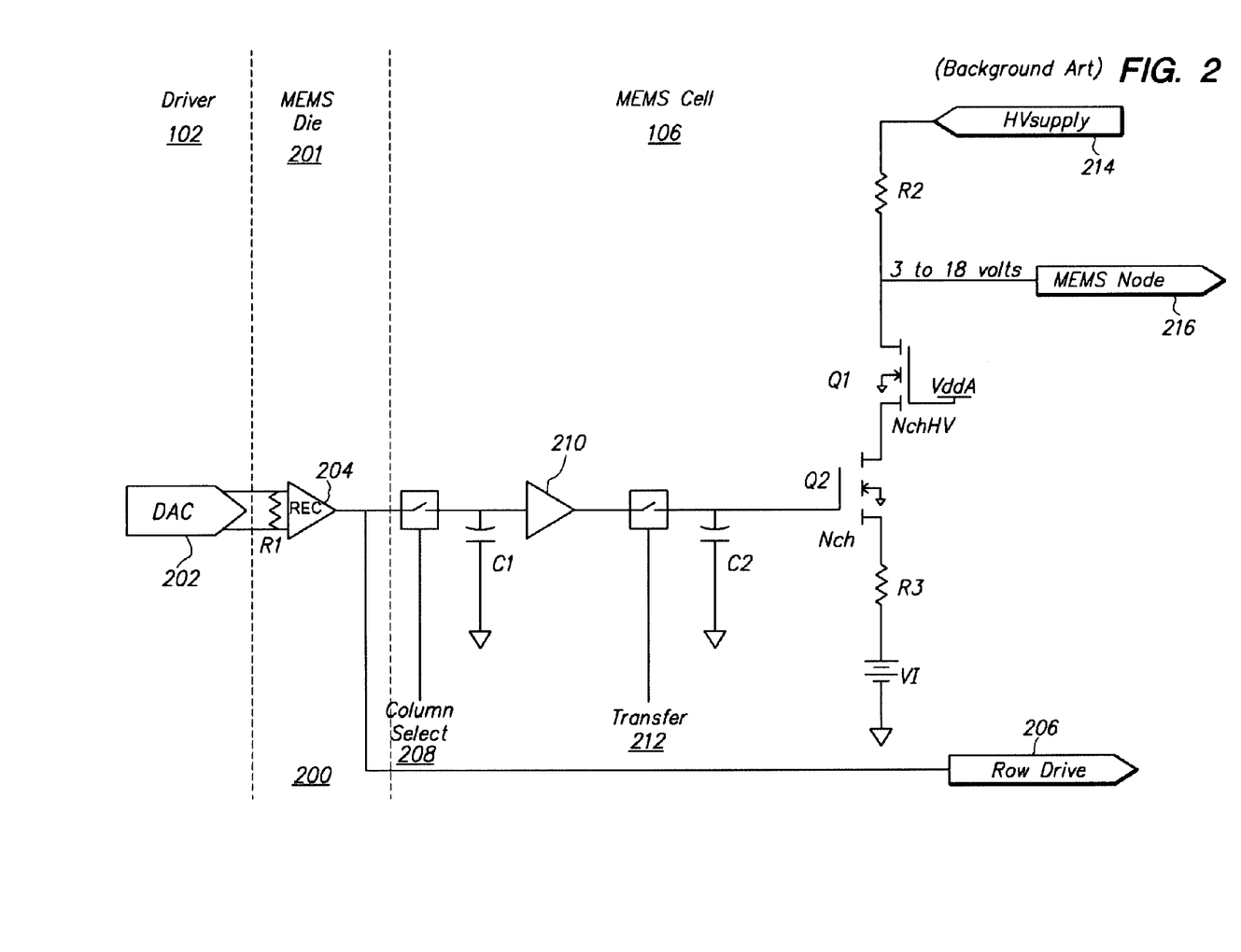
FIG. 2 is a schematic diagram of a conventional MEMS driver circuit.

FIG. 2 is a schematic diagram of a conventional MEMS driver circuit 200 that can be used with the array 100 shown in FIG. 1. This example uses a sample and hold circuit at each cell with sampling of the row analog data at each column in turn. Typically, this approach would require a high voltage sample and hold or a low voltage one with an amplifier on the output stage. In FIG. 2, a digital-to-analog (DAC) 202 drives a signal to a receiver 204 on the MEMS die 201. The output of the receiver 204 can be the row drive signal 206 and it can connect to a column select switch 208. Capacitor C1 can connect to the output of the column switch 208 and to the input of amplifier OP 210. The output of OP 210 can connect to a transfer switch 212. Capacitor C2 can connect to the transfer switch 212 and to a high voltage (HV) driver section. The HV driver section can include a resistor R2 connected between a high-voltage supply (HV supply) 214 and the MEMS cell 106 via the MEMS node 216. Transistors Q1 and Q2, along with resistor R3 and voltage source V1 can be used to generate the current needed to produce a voltage across R2 complete the HV driver section. The circuit 200 allows for a voltage range of between about 3V and about 18V at the MEMS node 216 of the cell 106.

SUMMARY

In one embodiment, a micro electromechanical system (MEMS) driver circuit receives a pulse-width modulated (PWM) signal and uses it to control a voltage at a MEMS cell. The driver circuit further includes a current source, a capacitor, and a reset circuit that can discharge the capacitor. The voltage at the MEMS cell can be controlled in proportion to the pulse width of the PWM signal.

In another embodiment, a MEMS driver circuit receives a first PWM signal and a second PWM signal. Each PWM signal is coupled to a current source. One current source can provide a course current control and the other current source can provide fine current control. The driver circuit can further include a capacitor and a reset circuit for discharging the capacitor. The voltage at the MEMS cell can be controlled in proportion to a summation of the first and second current sources.

According to another aspect of the embodiments, a method of controlling a voltage at a MEMS cell is disclosed. The method includes the steps of receiving a PWM signal, controlling a current source with the PWM signal, and adjusting the voltage at the MEMS cell in proportion to a pulse width of the PWM signal.

DETAILED DESCRIPTION

The approach discussed above in the Background section has several disadvantages, including circuit complexity, cross-talk resulting from driving a sensitive analog signal at high speed onto the MEMS die and then across the array, and data-dependent errors resulting from voltage drops across the MEMS die. What is needed is an approach that overcomes these limitations in controlling a two-dimensional array of MEMS cells.

Described herein are embodiments suitable for controlling MEMS devices and other applications that may include light modulators and devices. According to embodiments, amplitude information is brought onto the MEMS die or chip in digital form, as a pulse-width modulated (PWM) signal. This can eliminate the need to bring sensitive analog signals onto and across the chip and it may reduce the need for a large device pin count, as may typically be required for parallel digital data interfaces. The PWM signal can be received and reshaped, including by any necessary level-shifting for voltage level compatibility, at the chip boundary. This approach can essentially eliminate the majority of the effects of noise and cross-talk, as described above.

Figure 3:
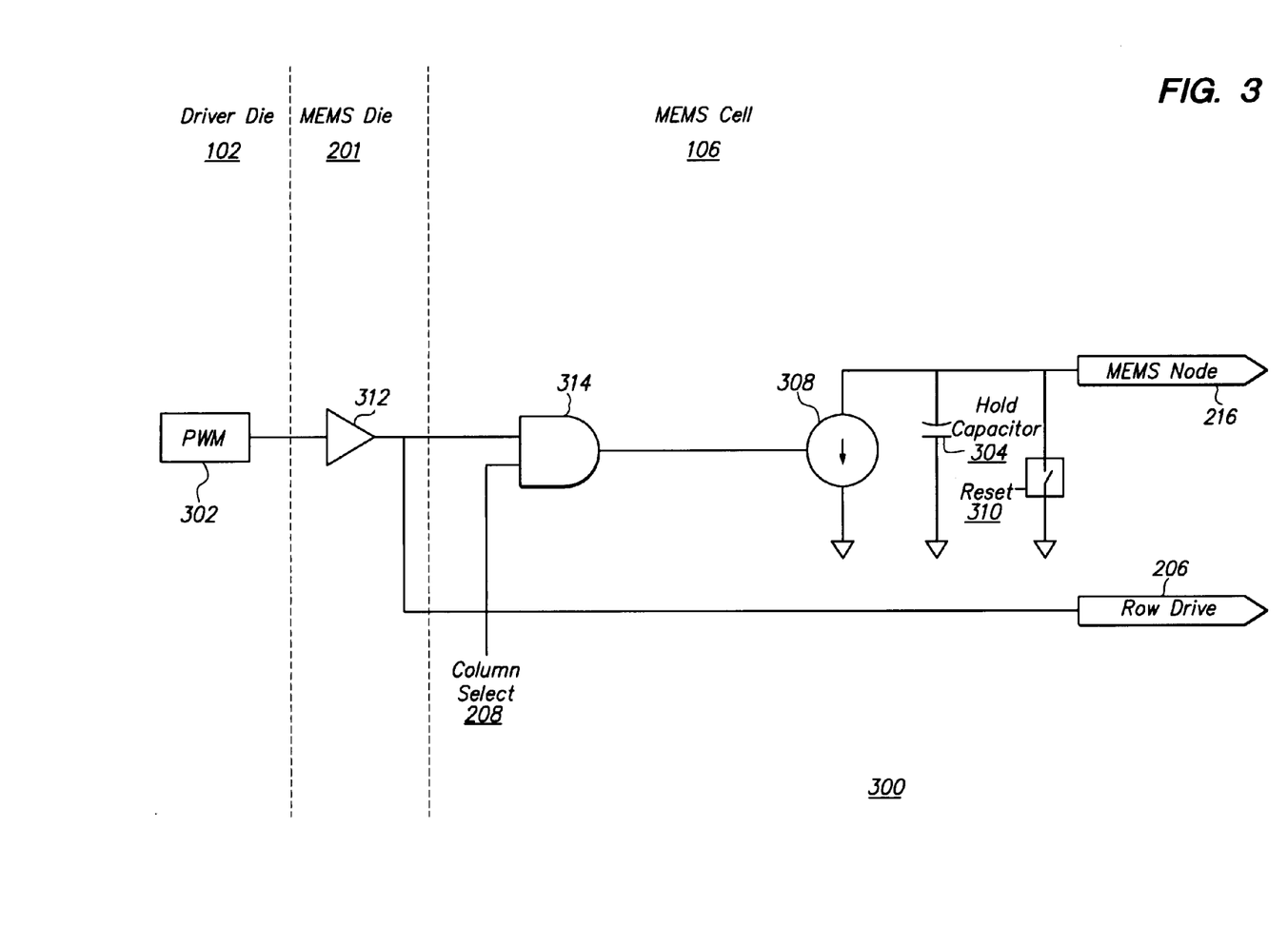
FIG. 3 is a schematic diagram of a MEMS driver circuit according to an embodiment.

Referring to FIG. 3, in each MEMS cell 106, the PWM signal 302 corresponding to that cell 106 can be selected by the column select line 208. Thus, the signals remain essentially digital in nature until the final stage where it can be converted to a current and used to charge a hold capacitor 304. The "MEMS Node" 216 can connect to a movable structure (e.g., a ribbon in a particular example MEMS device) in a MEMS cell 106. The voltage at the MEMS node 216 can be directly proportional to the pulse width of the PWM signal 302. Accordingly, the digital pulse width of the PWM signal 302 can be used to control a voltage level, such as the MEMS node 216 at the MEMS cell 106. This can then control a modulating effect on light impinging on the MEMS cell 106. Each hold capacitor 304 in each row can be charged in turn to the desired level. In this one hold capacitor approach, the MEMS cells 106 can be brought to a desired state in sequential fashion and not all at the same time. This method may be ideal for a pulsed illumination source on the MEMS where the state of a MEMS cell 106 need only be "correct" or in a targeted state for a relatively short period of time. However, this approach could also be used for other types of illumination sources.

Referring again to FIG. 3, a schematic diagram of a MEMS driver circuit 300 according to an embodiment is shown. Of course, one skilled in the art would recognize a number of different ways to implement a driver circuit according to the teachings of this embodiment. For example, the current source 308 can be implemented as a transistor operating in saturation mode. The reset switch circuit 310 can be a transistor or any other element or circuit that can implement a switching function. The buffer stage 312 accepting the PWM signal and providing a row drive signal can include voltage level shifting or translation circuitry as well as signal strength boosting circuitry, for example. Also, as will be described below, a high voltage stage can be included with at least 3 transistors per MEMS cell to implement these functions. Also, the logic circuit 314 receiving the column select signal can be implemented in any number of ways, including, but not limited to pass gate logic or other logic functions or circuits.

Figure 4:
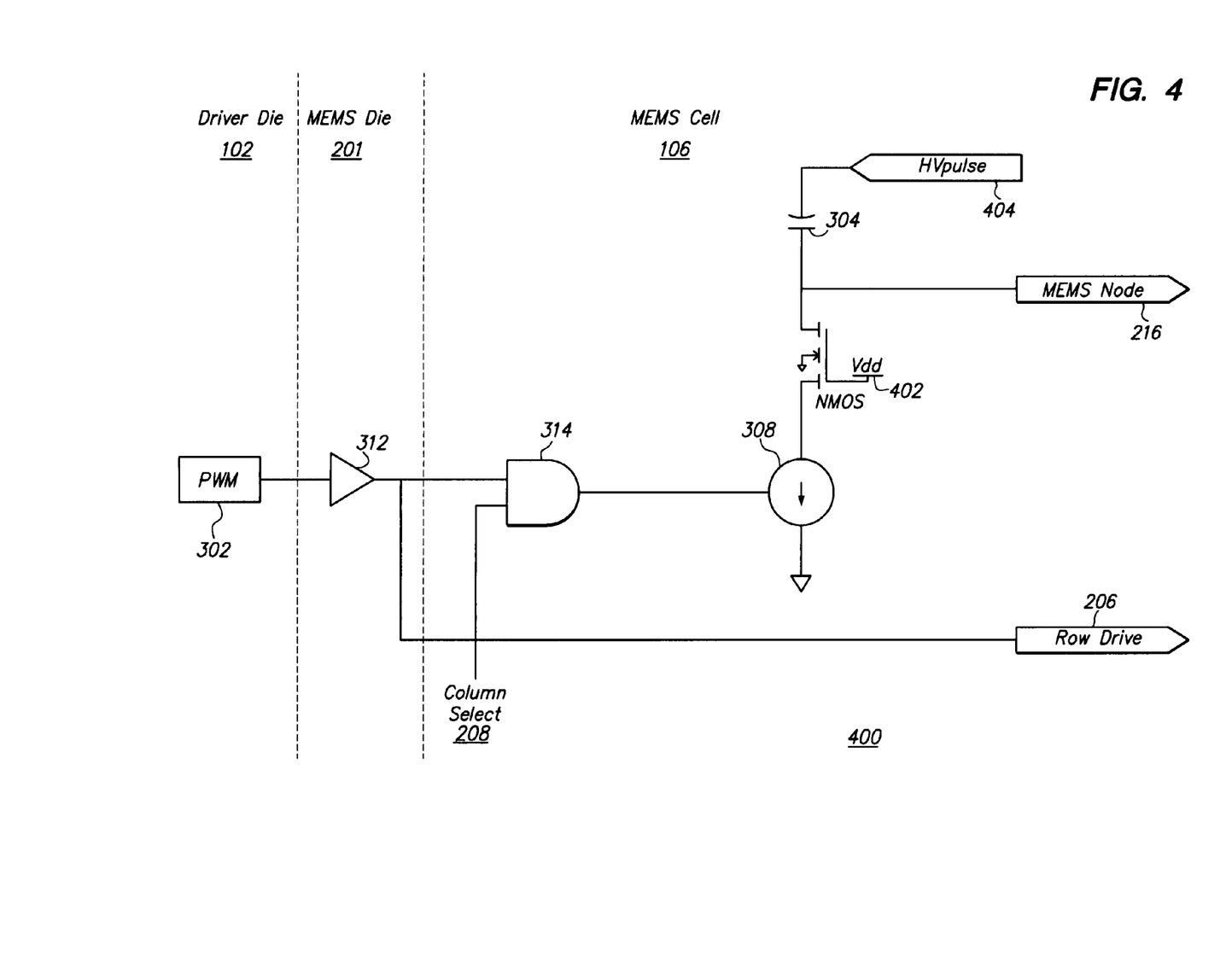
FIG. 4 is a schematic diagram of an example implementation of the MEMS driver circuit according to the embodiment of FIG. 3.

FIG. 4 is a schematic diagram of an example implementation 400 of the MEMS driver circuit 300 according to the embodiment of FIG. 3. The high voltage transistor "NMOS" 402 can be used to isolate the current source 308 from the high voltage seen at the output 216. In one particular example, the voltage at the MEMS node 216 can range as high as about 25V. In this circuit 400, a global reset function can be accomplished by turning all of the PWM drivers on (i.e., all PWM signals can go high), turning all of the column select signals 208 on and bringing the high voltage pulse (Hvpulse) signal 404 to ground. The current source transistor 308 can then discharge the hold capacitor 304 and the MEMS node 216 can also be discharged to ground.

Figure 5:
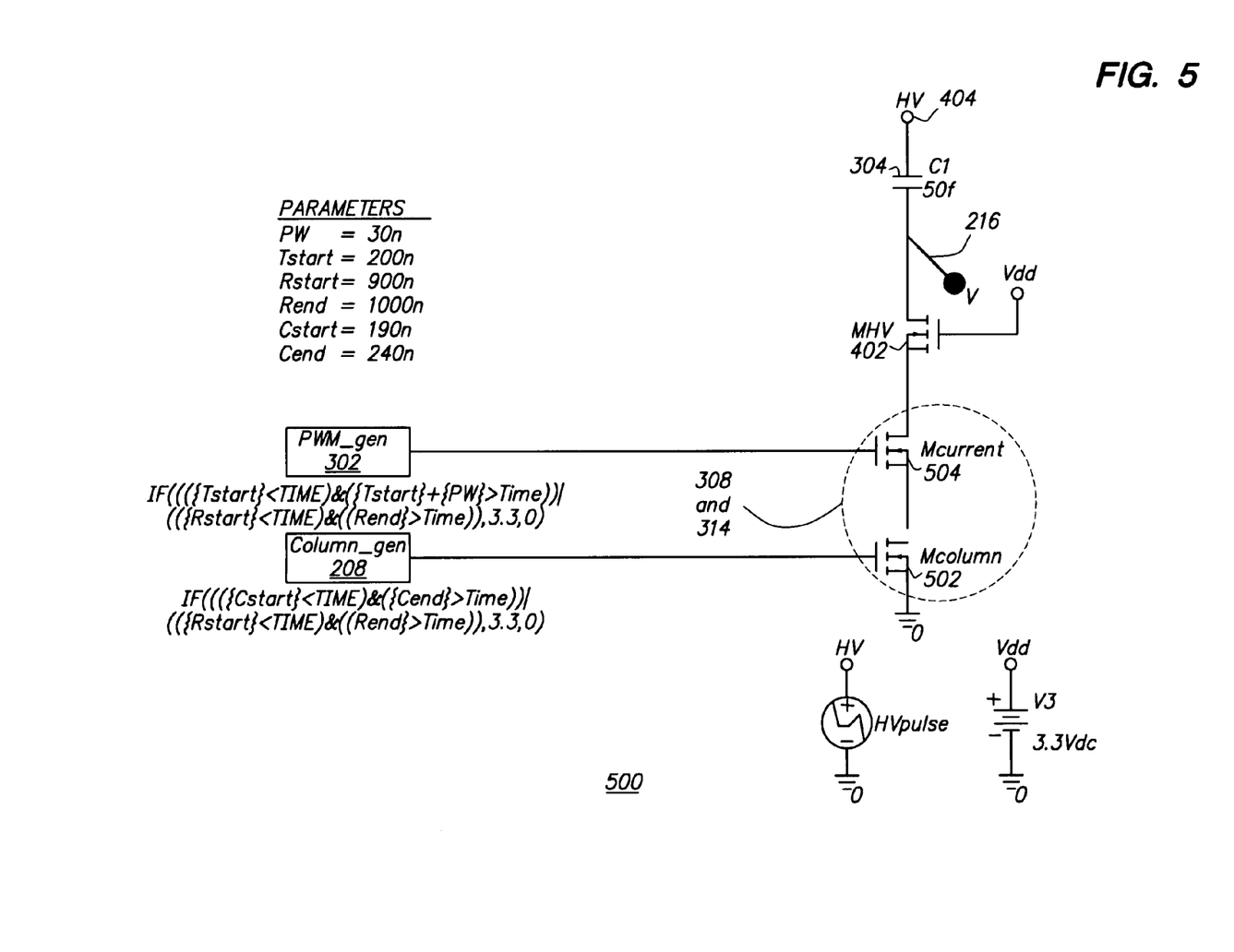
FIG. 5 is a simulation schematic diagram of a MEMS driver circuit according to the circuit of FIG. 4.
Figure 6:
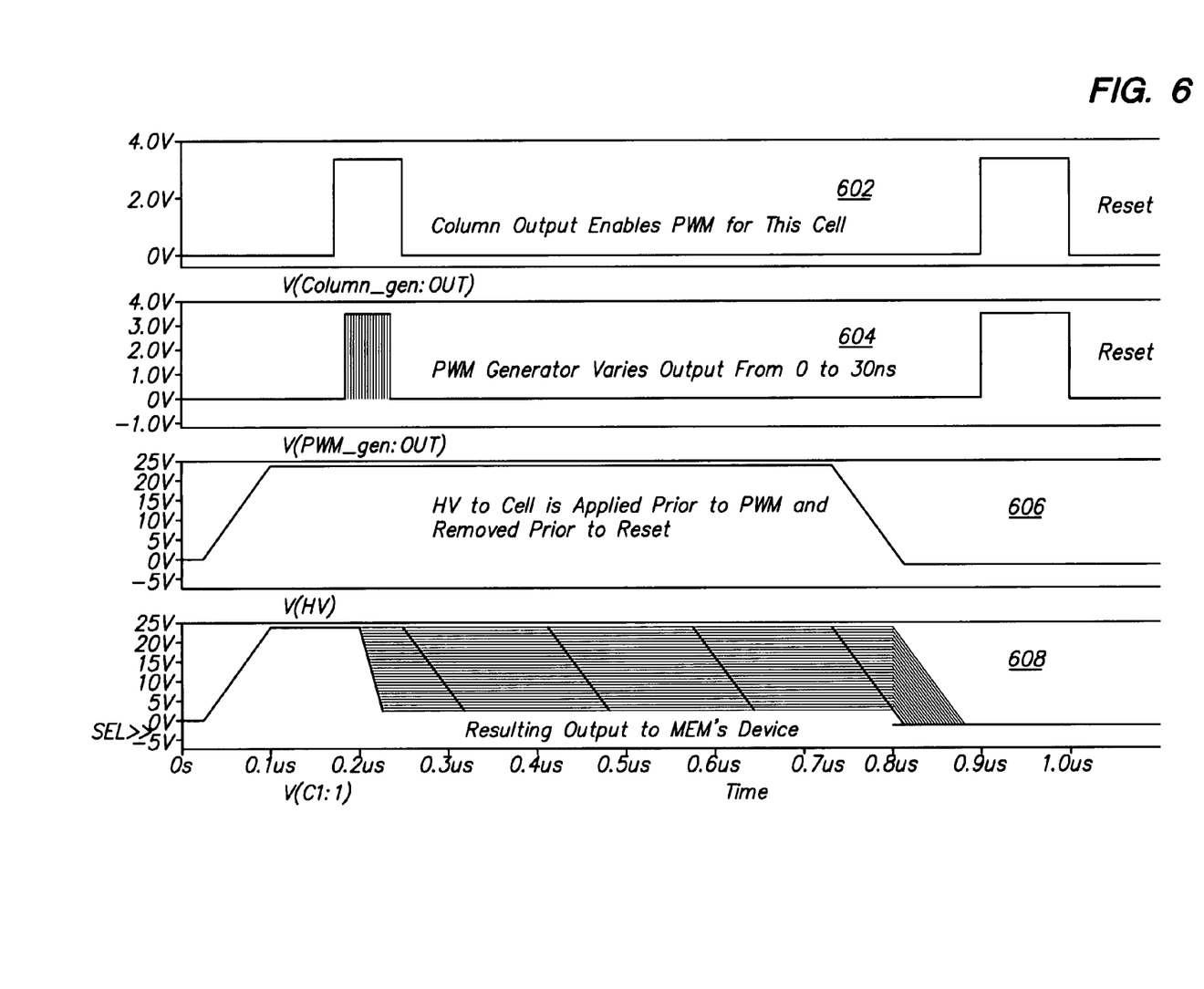
FIG. 6 is a timing diagram showing simulation results for the simulation schematic of FIG. 5.

FIG. 5 shows a simulation schematic diagram 500 of a MEMS driver circuit 400 according to the circuit of FIG. 4. That is, the circuit 400 of FIG. 4 can be modified in order to facilitate circuit simulation. FIG. 6 includes timing diagrams showing simulation results for the simulation schematic of FIG. 5. In FIG. 5, the "AND" function 314 is implemented using two series transistors: one transistor 502 for the column select and one transistor 504 (in saturation mode) for the current source 308.

The simulation was done in order to simulate a MEMS cell 106 where the pulse width of the PWM signal 302 is varied. The results of the simulation is shown in FIG. 6, where different symbols represent different experiments. In FIG. 6, the top (first) graph 602 shows the column select signal, with the first high pulse enabling the PWM signal 302 to pass through for the particular cell and the second pulse enabling a reset function. The second graph 604 shows a PWM signal 302 with high pulses varied from 0 ns to 30 ns during the column enable period. The PWM signal 302 is then held in a high state for the reset function. The third graph 606 shows the "HV" (high voltage) signal 404 changing from 0V to 25V. HV 404 is then discharged to 0V for the reset function. The bottom (fourth) graph 608 shows the voltage generated at the MEMS node 216 (shown as a "V" probe in the simulation schematic of FIG. 5). The superimposed graphs show the various voltage levels set on this node during the column enable period. These levels are in proportion to the pulse widths of the PWM signals 302 allowed through during the column enable period. The levels at the MEMS node 216 are then maintained after the column enable signal 208 goes low by the holding capacitor C1, which is a 50 fF capacitor in FIG. 5. As HV 404 is discharged prior to the reset, all voltage levels in the fourth graph are brought down. Upon the reset function, all of these levels are brought to about 0V.

Figure 7:
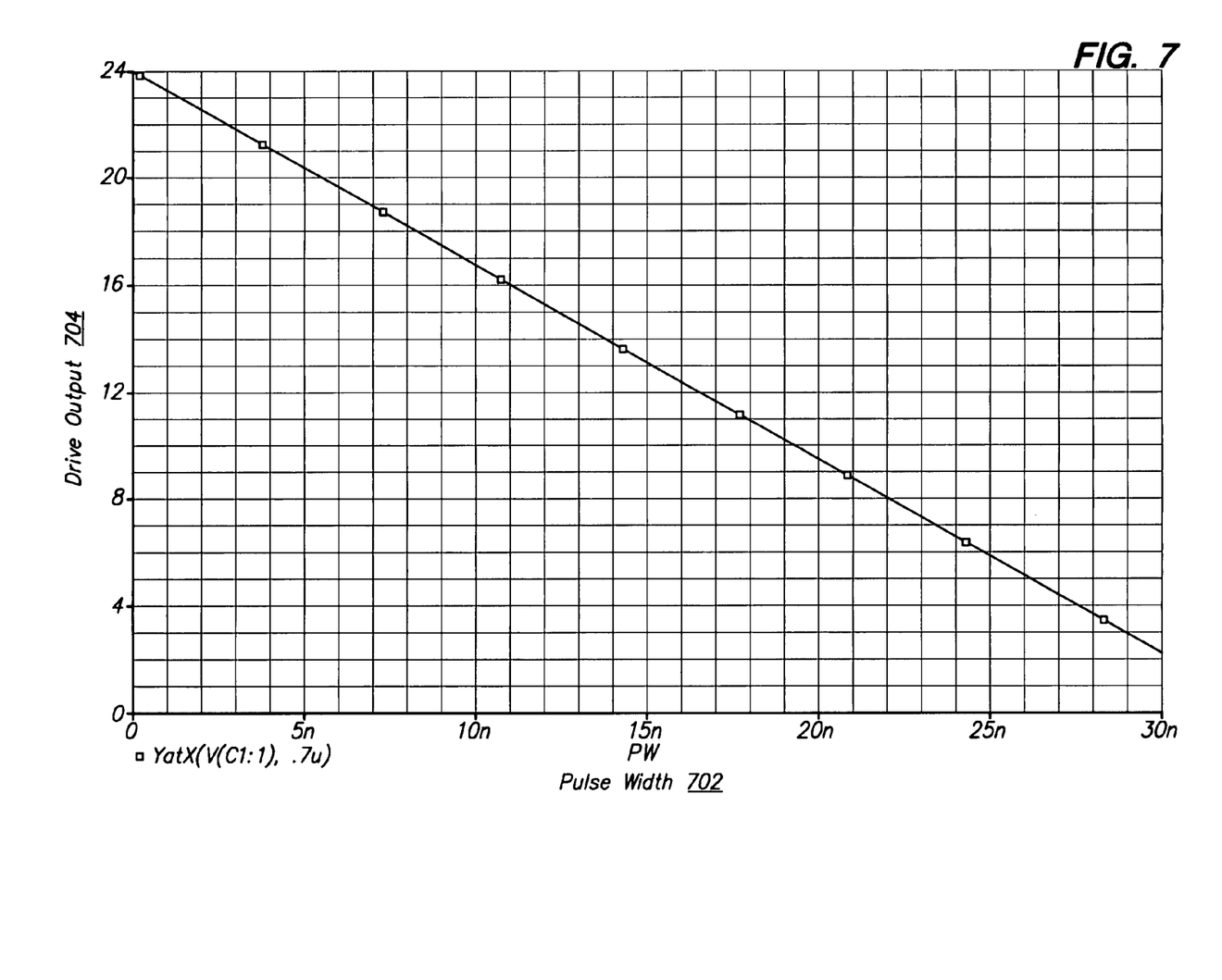
FIG. 7 is a diagram showing the drive output versus the pulse width for the simulation schematic of FIG. 5.

FIG. 7 shows the drive output 704 versus pulse width 702 for the simulation schematic of FIG. 5. The x-axis shows pulse widths 702 for the PWM signal 302 increasing from about 0 ns to about 30 ns. The y-axis shows the voltage level, such as on "MEMS Node" 216 decreasing from about 24V to about 2V in a linear relation. This represents an example relation of the pulse width of the PWM signal 302 to the MEMS node voltage level 216.

Figure 8:
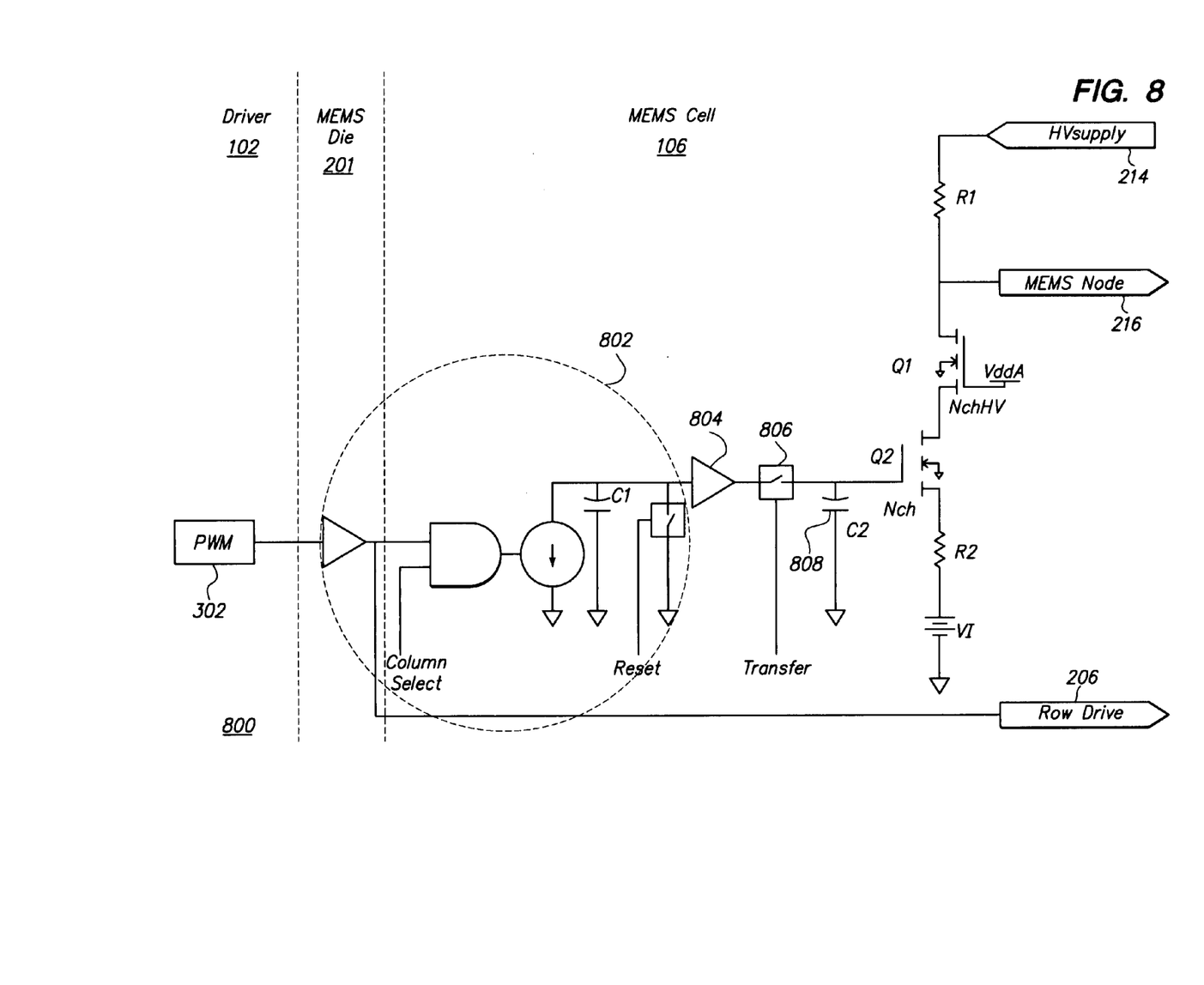
FIG. 8 is a schematic diagram of a two-stage MEMS driver circuit according to an embodiment.

In some applications, the light source (e.g., LASER) used to impinge light onto the MEMS cells 106 may be of the continuous wave (CW) type. For this type of light source, the driver outputs corresponding to each MEMS cell 106 must change its state at substantially the same time, so there is a continuous resultant effect from the modulated light. For such an application, a two-stage MEMS driver circuit, such as the example circuit 800 shown in FIG. 8 may be a preferred solution. The first stage 802 can be essentially the same as the single-stage PWM controlled sample and hold circuit as described above for FIG. 3. The second stage can include operational amplifier OP 804 or any suitable circuit stage isolation structure, a transfer switch 806, and a second hold capacitor C2 808. The last portion of the circuit of FIG. 8 (i.e. HV supply 214, R1, Q1, Q2, R2, and V1) that directly drives the MEMS node 216 can be essentially the same as that in the conventional HV drive structure 200 described above with reference to FIG. 2. Returning to FIG. 8, the second stage, including the transfer switch 806, which may include any suitable switching element, can function as a synchronization stage. When the "Transfer" signal is active, the entire image as modulated from the MEMS cells 106 on the device can be updated at essentially the same time. So, the entire image may effectively be updated at each MEMS cell 106 simultaneously in response to the transfer signal activation.

Figure 9:
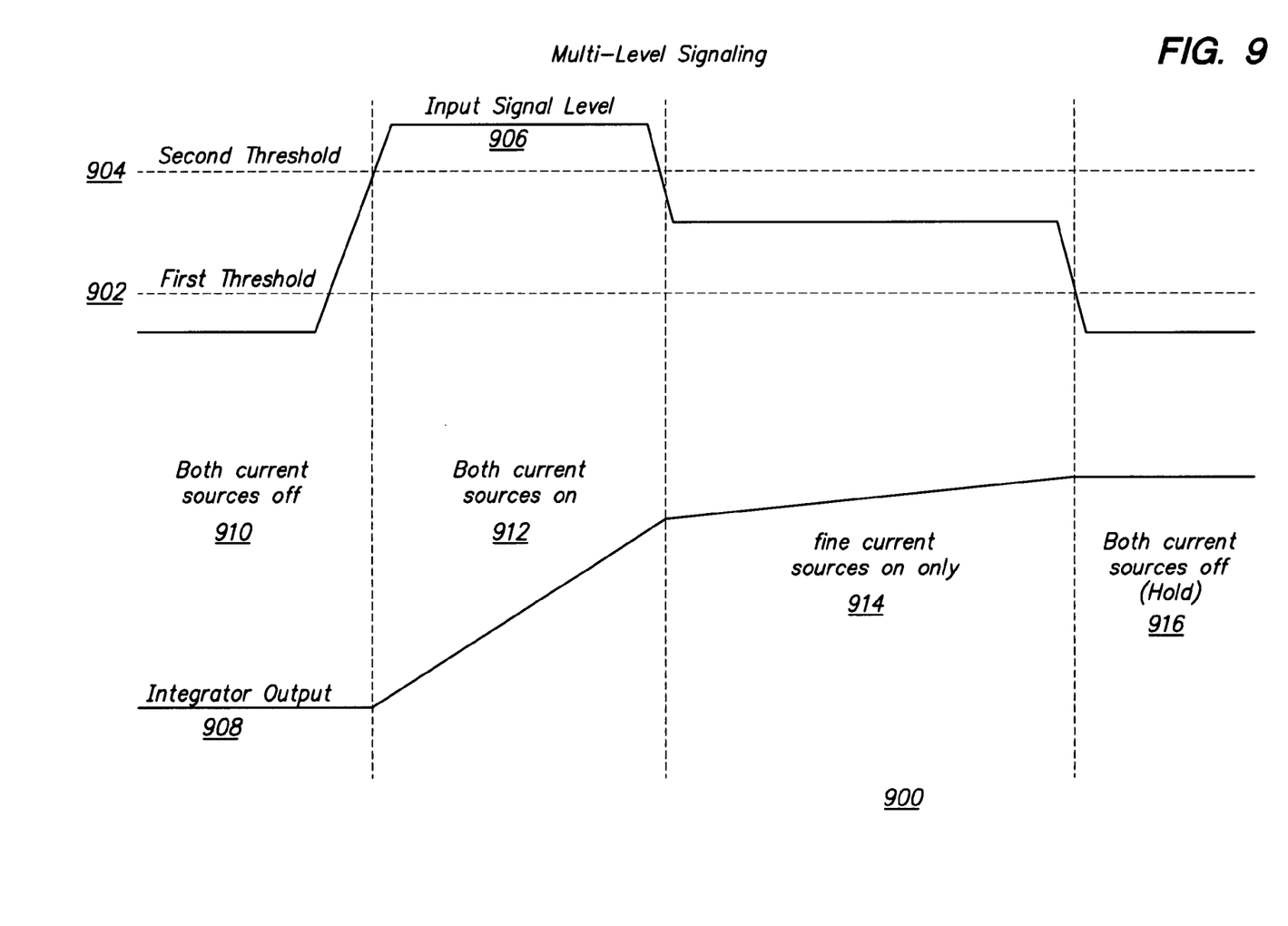
FIG. 9 is a signal diagram showing a multi-level signal approach applicable to a circuit according to an embodiment.

Another approach that can reduce the speed at which the PWM signal needs to be generated to produce a desired range and/or resolution of MEMS node 216 voltage levels includes the multi-level signal approach 900 shown in FIG. 9. In one example, a MEMS device may have 100 columns with each modulated at a rate of about 100 kilopixels/second. In this case, each column may need to be written in 100 ns (nanoseconds). If a desired resolution is 256 gray levels, the PWM generator would need to operate at a minimum rate of about 2.56 GHz. Accordingly, a multi-level signaling approach may be useful for such an application. Such an approach may include first 902 and second 904 thresholds for the input signal 906 level that may correspond to control of a two current source driver circuit.

Figure 10:
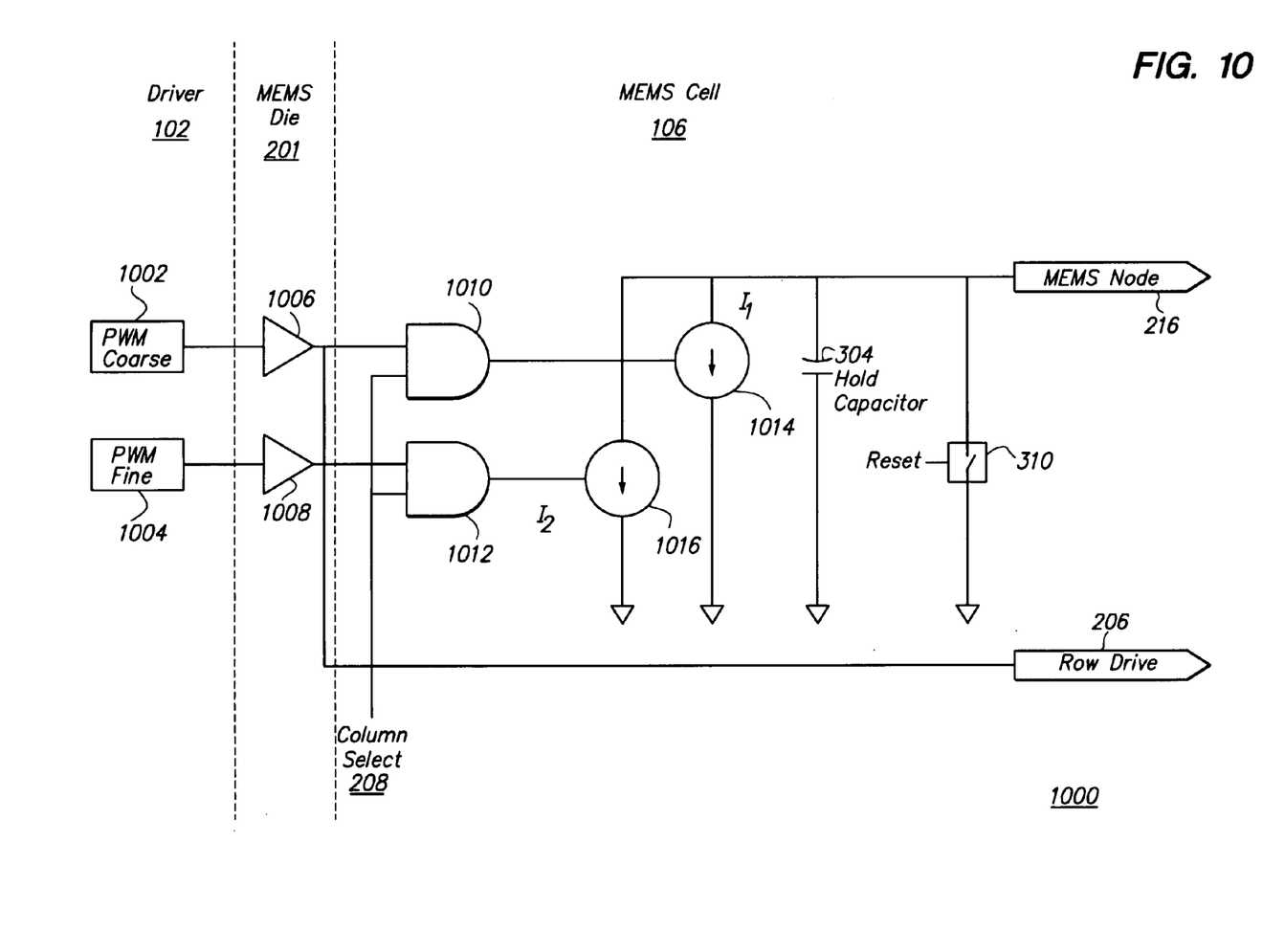
FIG. 10 is a schematic diagram of a two-PWM signal MEMS driver circuit according to an embodiment.

Referring to FIG. 10, a schematic diagram of a two-PWM signal MEMS driver circuit 1000 according to an embodiment, and can be built with either separate PWM signals or multi-level signaling approach 900. This circuit 1000 can be used to allow for reduced speed requirements of the input signal 906 by including a coarse current source 1014 and a fine current source 1016 for each cell 106. The hold capacitor 304 and reset circuitry 310 portions can be similar to those described above with reference to FIG. 3. In FIG. 10, a PWM "course" signal 1002 and a PWM "fine" signal 1004 can be received. Each can be received by a corresponding buffer circuit (1006 and 1008, respectively) and then input to a corresponding logic circuit (1010 and 1012, respectively). In this example, the column select signal 208 can connect to "AND" type gates of said logic circuitry to provide control for a course current source 1014 and a fine current source 1016. The sum of these two current sources can then be used to charge the hold capacitor 304 and to generate the voltage at the MEMS node 216.

Referring back to FIG. 9, when the input signal level 906 starts below the first threshold level 902, then both coarse and fine current sources would be off 910, resulting in a low integrator output level 908. When the input signal level 906 rises to be above the second threshold level 904, then both coarse and fine current sources would be turned on 912, resulting in a relatively rapidly rising integrator output level 908. When the input signal level 906 is reduced such that it is below the second threshold level 904 but above the first threshold level 902, then only the fine current source 1016 would be turned on 914, resulting in a relatively slowly rising integrator output level 908. Finally, when the input signal level 906 is reduced such that it is below the first threshold level 902, then both current sources would be turned off 916, resulting in a steady integrator output level 908.

This concept can also be extended to three or more current sources. In principal, for example, two 16-level PWM signals could produce 256 gray scales, reducing the PWM generator clock rate to about 160 MHz. In some cases, matching current sources to be exactly a ratio of 16-to-1 may be a particular challenge. One way to compensate for some inaccuracies in the ratio may be to provide more precision in the PWM signal. For example, the fine control may include 32 levels instead of 16 levels.

Note that the PWM signals, as described above with reference to the embodiments may be included on the same physical die or integrated circuit with the MEMS structures, or they could alternatively be implemented as a separate chip.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A micro electromechanical system (MEMS) driver circuit, comprising:
   a current source coupled to a MEMS device;
   a hold capacitor coupled to the MEMS device; and
   a reset circuit configured to discharge the hold capacitor,
   wherein said current source is configured to be controlled by a pulse-width modulated (PWM) signal, and
   wherein said current source, hold capacitor, and reset mechanism comprises a first stage, and further comprising a second stage which functions as a synchronization stage.

2. The driver circuit of claim 1, wherein a voltage driven to the MEMS device is approximately proportional to a pulse width of the PWM signal.

3. The driver circuit of claim 2, wherein the voltage driven to the MEMS device controls a physical position of an element the MEMS device.

4. The driver circuit of claim 1, further comprising:
   AND logic configured to receive as inputs the PWM signal and a column select signal and to output a signal to control the current source.

5. The driver circuit of claim 4, further comprising a buffer circuit configured to buffer the PWM signal which is an input to the AND logic.

6. The driver circuit of claim 5, wherein the buffered PWM signal output by the buffer circuit comprises a row drive signal.

7. The driver circuit of claim 4, wherein the AND logic and the current source are implemented using two transistors in series.

8. The driver circuit of claim 1, wherein the reset mechanism comprises a switch configured to ground the hold capacitor when the switch is closed.

9. The driver circuit of claim 1, wherein the hold capacitor is configured to receive a voltage pulse signal, and wherein the reset mechanism includes bringing the voltage pulse signal to ground.

10. The driver circuit of claim 1, further comprising a transistor coupled to the current source to isolate the current source from an output voltage of the driver circuit.

11. The driver circuit of claim 1, wherein the synchronization stage comprises an amplifier circuit coupled to an output of the first stage, a transfer switch coupled to the output of the amplifier circuit and controlled by a transfer signal, and a second hold capacitor coupled to the output of the transfer switch.

12. The driver circuit of claim 1, further comprising a second current source, wherein the second current source is configured to be controlled by a second PWM signal.

13. The driver circuit of claim 12, wherein an output of the driver circuit is coarsely controlled by one of the PWM signals and finely controlled by another of the PWM signals.

14. The driver circuit of claim 13, wherein the hold capacitor is charged according to a summation of outputs of the two current sources.

15. The driver circuit of claim 1, wherein the current source and hold capacitor are integrated into a semiconductor die with the MEMS device.

16. The driver circuit of claim 15, wherein the PWM signal is generated on a driver die that is separate from the die with the MEMS device.

* * * * *